United States Patent [19]

Ylikotila

[11] Patent Number: 5,574,985
[45] Date of Patent: Nov. 12, 1996

[54] RADIO TRANSMITTER RECEIVER FOR OPERATION IN PLURAL RADIO SYSTEMS HAVING UNEQUAL BANDS OF OPERATING FREQUENCIES REPRESENTED BY CHANNEL NUMBERS

[75] Inventor: Taavi Ylikotila, Äänekoski, Finland

[73] Assignee: Nokia Telecommunications Oy, Espoo, Finland

[21] Appl. No.: 290,823

[22] PCT Filed: Feb. 12, 1993

[86] PCT No.: PCT/FI93/00047

§ 371 Date: Nov. 7, 1994

§ 102(e) Date: Nov. 7, 1994

[87] PCT Pub. No.: WO93/16530

PCT Pub. Date: Aug. 19, 1993

[30] Foreign Application Priority Data

Feb. 14, 1992 [FI] Finland .................................. 920645

[51] Int. Cl.⁶ ...................................................... H04B 1/40
[52] U.S. Cl. ...................... 455/76; 455/183.2; 455/186.1; 455/260
[58] Field of Search ............................ 455/76, 77, 161.2, 455/168.1, 180.1, 180.2, 180.3, 183.1, 183.2, 185.1, 186.1, 188.1, 188.2, 259, 260; 348/731

[56] References Cited

U.S. PATENT DOCUMENTS

| | | |
|---|---|---|
| 4,377,871 | 3/1983 | Borras et al. . |
| 4,392,253 | 7/1983 | Yamada et al. ...................... 455/186.1 |
| 4,403,342 | 9/1983 | Borras et al. . |
| 4,442,413 | 4/1984 | Hayashida et al. ................... 455/186.1 |
| 4,618,997 | 10/1986 | Imazeki et al. . |
| 4,688,261 | 8/1987 | Killoway et al. . |

FOREIGN PATENT DOCUMENTS 646556  11/1984  Switzerland .

OTHER PUBLICATIONS

MPT 1343, Performance Specification: System Interface Specification for radio units to be used with commercial trunked networks operating in Band III sub-bands 1 and 2, Jan. 1988, revised Sep. 1991.
MPT 1327, A Technical Overview of the United Kingdom PMR Trunking Standards.

*Primary Examiner*—Chi H. Pham
*Attorney, Agent, or Firm*—Cushman Darby & Cushman, L.L.P.

[57] ABSTRACT

A radio device for operation in at least two different radio systems having unequal bands of operating frequencies represented by channels numbers. The device includes a radio transmitter; a radio receiver; a frequency synthesizer for generating local oscillator frequencies for the radio transmitter and radio receiver, respectively; and a control for controlling the frequency synthesizer so as to lock it to transmitting and receiving frequencies corresponding to a selected channel number. The control includes a memory for storing frequency synthesizer control data of a single channel number for each different radio system, on the basis of which control data the control is capable of deriving control data of any other channel number for the radio system in which the radio device is currently operating.

6 Claims, 2 Drawing Sheets

RADIO TRANSMITTER RECEIVER FOR OPERATION IN PLURAL RADIO SYSTEMS HAVING UNEQUAL BANDS OF OPERATING FREQUENCIES REPRESENTED BY CHANNEL NUMBERS

FIELD OF THE INVENTION

The invention relates to a radio device for operation in at least two different radio systems having unequal bands of operating frequencies represented by channel numbers, the radio device comprising a radio transmitter; a radio receiver; a frequency synthesizer means for generating local oscillator frequencies for the radio transmitter and the radio receiver, respectively; and a control means for controlling the frequency synthesizer means so as to lock the synthesizer means to transmitting and receiving frequencies corresponding to a selected channel number.

BACKGROUND OF THE INVENTION

In private automatic mobile radio networks or trunked networks, several user groups or even several user organizations share the same radio channels and other resources in a common network. Typical private radio network applications include energy production and distribution, communal and municipal services, transportation, construction, maintenance, and emergency services, such as police, fire alarm and ambulance. A private mobile radio network may offer fast access within the user's own organization, individual or group communication, data communication, etc. The system checks the subscriber authorization and allocates resources. An individual subscriber is unaware that he uses the same frequencies as other subscribers as the system automatically selects a free radio channel for a call during the call set-up. This kind of radio telephone systems usually have a rather limited Geographical coverage, and so the user may easily get outside the service area of his own system, and thus cannot use his radio telephone. Therefore there has arisen a need to be able to use the same radio telephone in several different systems.

The specifications MPT 1327 and MPT 1343 issued by the British Ministry of Trade and Industry have become kind of de facto standards in Europe for private mobile radio networks. MPT 1327 specifies signalling over the radio path, while MPT 1343 specifies the operation and structure of the radio telephone. Systems complying with these specifications have been and will be introduced in different European countries. All radio telephones used in the different systems actually comply with the same MPT 1343 specification, wherefore they can, in principle, be transferred from one radio telephone network to another by varying the network-specific radio telephone parameters complying with the MPT 1343.

The radio telephone systems usually employ special radio channel numbers in all internal signalling for representing transmitting and receiving frequencies, i.e. radio channels, each channel number representing a certain pair of transmitting and receiving frequencies. A radio telephone or a similar radio device used in this kind of system converts each channel number internally into corresponding frequency synthesizer control data which controls the frequency synthesizer so as to cause it to be locked to the transmitting and receiving frequency pair corresponding to the channel number in the current radio system. When using the same radio telephone in different radio telephone networks, problems may be caused by the fact that a certain channel number, e.g. channel 1, may correspond to different frequencies in different radio telephone systems, as illustrated in FIG. 1. In FIG. 1, the frequency of the channel CH0 of the radio telephone system A is 410 MHz, while higher frequencies at intervals of 12.5 kHz or 25 kHz correspond to the other channel numbers. The channel numbering of the system B in turn is such that the frequency corresponding to the channel CH0 is 420 MHz. As a consequence, the radio telephone cannot operate in both systems A and B as the channel numberings and frequency bands of the systems do not match.

SUMMARY OF THE INVENTION

The object of the invention is to provide a radio device which is capable of operating in different radio networks where the channel numberings and frequency bands do not correspond to each other.

This is achieved by means of a radio device of the type described in the introductory portion of this specification, which according to the invention is characterized in that the control means comprises a memory means for storing frequency synthesizer control data of a single channel number for each different radio system, on the basis of which control data the control means is capable of deriving control data of any other channel number for the radio system in which the radio device is currently operating.

The basic idea of the invention is that frequency synthesizer control data corresponding to a single channel number is stored in the radio device for each different radio system. The stored control data determines the physical frequency corresponding to said one channel number, and corresponding control data for the other channel numbers in the system are derived therefrom. An advantage of the invention is that the channel data stored for one channel number enables the channel numbering of the radio device to be shifted and aligned to the frequency band used by the radio system in which the radio device is currently operating. The invention also enables a radio device operative in a nearly unlimited number of different radio networks to be realized very simply, advantageously and with a small requirement of memory capacity. In the preferred embodiment of the invention the control data is the divisor of at least one frequency divider means contained in the frequency synthesizer means. In the preferred embodiment of the invention, the divisor corresponding to the channel number 0 is stored in the memory.

BRIEF DESCRIPTION OF THE DRAWINGS

In the following, the invention will be described by means of illustrating embodiments with reference to the attached drawings, in which.

DETAILED DESCRIPTION OF THE INVENTION

Figure 2:
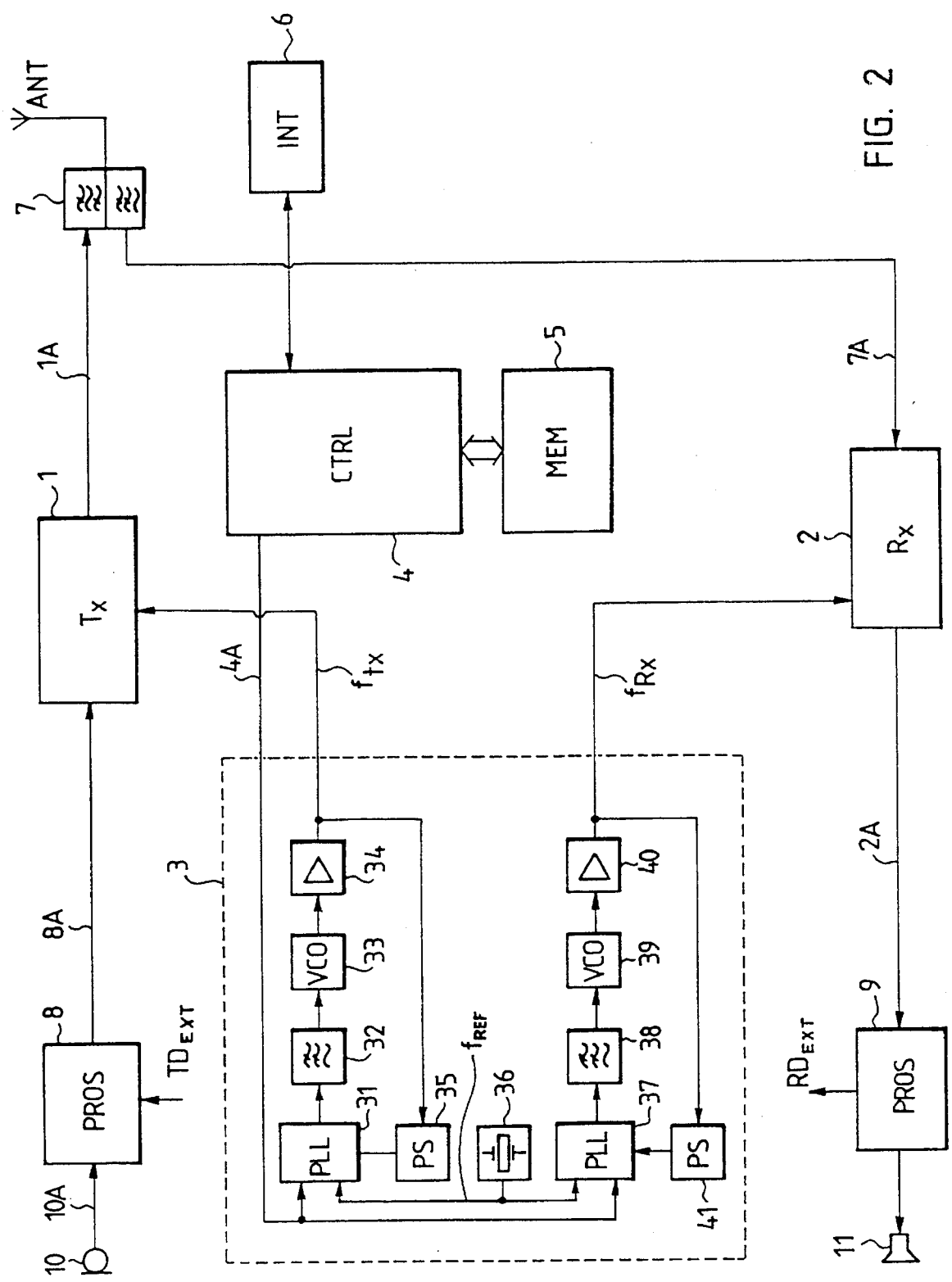
FIG. 2 is a block diagram illustrating a radio device according to the invention.

In the radio device shown in FIG. 2, such as a radio telephone, a baseband signal processing unit 8 derives a modulating baseband transmitting signal 8A from an audio signal 10A generated by a microphone 10 or an external audio or data signal $TD_{EXT}$. The derived transmitting signal is applied to a radio transmitter section 1 in which it modulates a transmitting-frequency local oscillator signal $f_{TX}$ from a frequency synthesizer unit 3. A modulated transmitting-frequency RF output signal 1A from the radio transmitter section 1 is applied through a duplex filter to an antenna ANT.

A receiving-frequency RF signal 7A received by the antenna ANT is applied through a duplex filter 7 to a radio receiver section 2, where it is mixed in one or more mixing stages into a received baseband signal 2A. A baseband signal processing unit 9 processes the signal 2A so as to control a loudspeaker 11 or derives from it an audio or data signal $RD_{EXT}$ to be applied to an external device. In the radio receiver section 2, a receiving-frequency local oscillator signal $f_{RX}$ generated by the frequency synthesizer 3 is utilized for the high-frequency mixing, i.e. the first mixing stage.

The frequency synthesizer 3 comprises two phase-locked loops for deriving the frequencies $f_{TX}$ and $f_{RX}$ from a reference frequency generated by a common crystal oscillator 36. The reference frequency $f_{REF}$ Of the crystal oscillator 36 is divided in phase comparators 31 and 37 by a divisor M which is programmed in a register of the phase comparators by a control unit 4 over a control bus 4A. The local oscillator frequency $f_{TX}$ is applied to one input in the phase comparator 31 through a fixed or programmable frequency divider 35. The phase comparator 31 generates a voltage proportional to the phase difference between the two signals, which voltage is applied through a lowpass filter 32 to a voltage-controlled oscillator 33 to cause it to change the output frequency $f_{TX}$ so that the phase difference decreases. Correspondingly, the phase comparator 37 compares a frequency $f_{REF/M}$ with the local oscillator frequency $f_{RX}$ applied through a fixed or programmable frequency divider 41 and generates a voltage proportional to the phase difference. The output voltage of the phase comparator 37 is applied through a lowpass filter 38 to a voltage-controlled oscillator 39 to cause it to change its frequency $f_{RX}$ so that the above-mentioned phase difference decreases. In addition, the phase-locked loops may contain amplifiers 34 and 40 for increasing the level of the local oscillator signals $f_{TX}$ and $f_{RX}$, respectively.

As is obvious to one skilled in the art, the synthesizer 3 may be realized in many ways different from that shown in FIG. 2. However, a common feature of all synthesizers is that they contain at least one programmable frequency divider such that the synthesized frequency can be changed by varying the divisor of the divider. In the preferred embodiment of the invention shown in FIG. 2, the divisor M is programmed by the control unit 4 in the internal frequency divider registers of the phase comparators 31 and 37 over the control bus 4A.

Each radio system in which the radio device according to the invention is operative utilizes a certain number of radio channels, e.g. pairs of transmitting and receiving frequencies in a full duplex system. For the purpose of internal signalling in the system, a channel number is assigned to each radio channel. On transition to a radio channel, the control unit 4 generates a divisor M corresponding to the channel number of the channel. The divisor M causes the output frequencies $f_{TX}$ and $f_{RX}$ of the frequency synthesizer 3 to be shifted and locked to the transmitting and receiving frequencies corresponding to the channel number in the current system.

According to the invention, a divisor M corresponding to a single channel number is separately stored in a memory 5 for each different radio system in which the radio device is to be used. In the preferred embodiment of the invention, the divisor M corresponding to the channel number 0 of the system is stored. On the basis of the stored divisor, the control unit 4 calculates divisors M corresponding to the other channel numbers for the radio system in which the radio device is currently operating. The control unit 4 may select the radio system to be used e.g. in response to a manual user command from a user interface 6.

Figure 1:
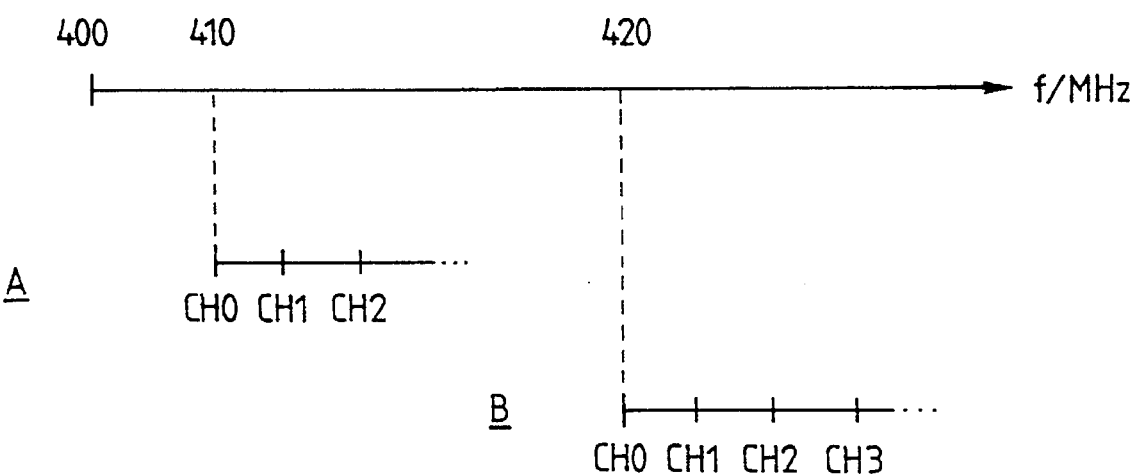
FIG. 1 illustrates the channel numbering of two different systems.

For instance, the radio device may operate in the systems A and B shown in FIG. 1. In this case the divisor M of a channel CH0 is stored in the memory 5 for the system A. The stored divisor M causes the synthesizer 3 to generate e.g. a transmitting frequency $f_{TX}$ of 410 MHz. Correspondingly, a divisor M of the channel CH0 is stored for the system B, as a result of which the synthesizer 3 synthesizes e.g. a transmitting frequency $f_{TX}$ of 420 MHz. As the channel spacing is constant within the radio system, e.g. 25 kHz or 12.5 kHz, the divisor corresponding to another channel number N can be easily calculated e.g. by adding a difference value (N–N0)*ΔM to the stored divisor M, where N0 is a channel number corresponding to the divisor M stored in the memory and ΔM is the difference value of the divisor corresponding to the channel spacing in the radio system.

The attached figures and the description related to them are only intended to illustrate the invention. In its details, the radio device according to the invention may vary within the scope and spirit of the attached claims.

I claim:

1. Radio device for operation in at least two different radio systems having unequal bands of operating frequencies represented by channel numbers, the radio device comprising a radio transmitter;

a radio receiver;

a frequency synthesizer means for generating local oscillator frequencies for the radio transmitter and the radio receiver, respectively; and a control means for controlling the frequency synthesizer means so as to lock the synthesizer means to transmitting and receiving frequencies corresponding to a selected channel number, the control means comprising a memory means for storing frequency synthesizer control data of a single channel number for each of the at least two different radio system, the control means being arranged to derive control data of any other channel number for the radio system in which the radio device is currently operating, from said frequency synthesizer control data.

2. Radio device according to claim 1, wherein the frequency synthesizer means comprises at least one frequency divider means which is programmable by the control means with a divisor which determines the local oscillator frequencies generated by the frequency synthesizer, and wherein said control data of said single channel number is a respective divisor for said frequency divider means.

3. Radio device according to claim 1, wherein the frequency synthesizer means comprises a first phase-locked loop comprising at least one first frequency divider means programmable by the control means for generating a transmitting-frequency local oscillator signal; and a second phase-locked loop comprising at least one second frequency divider means programmable by the control means for generating a receiving-frequency local oscillator signal; programmed first and second divisors in said first and second frequency divider means, respectively, determining the local oscillator frequencies generated by the frequency synthesizer, and wherein said control data of said single channel number consists of respective first and second divisors for said first and second frequency divider means.

4. Radio device according to claim 2, wherein the control means calculates a divisor $M_N$ of said any other channel number N by adding a difference value $(N-N_0)*\Delta M$ to a divisor $M_1$ stored in the memory means, where $N_0$ is said single channel number, $M_1$ is the divisor of said single channel number $N_0$ and $\Delta M$ is a divisor difference value representing a channel spacing in the respective radio system.

5. Radio device according to claim 1, wherein control data corresponding to a channel number 0 is stored in the memory means.

6. Radio device according to claim 1, wherein the control means selects the radio system to be used in response to a command inputted through a user interface.

* * * * *